(12) United States Patent
Mukhopadhyay et al.

(10) Patent No.: US 10,878,003 B2
(45) Date of Patent: Dec. 29, 2020

(54) SYSTEM AND METHOD FOR EXTRACTING STRUCTURED INFORMATION FROM IMPLICIT TABLES

(71) Applicant: Accenture Global Solutions Limited, Dublin (IE)

(72) Inventors: Abhisek Mukhopadhyay, West Bengal (IN); Shubhashis Sengupta, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 166 days.

(21) Appl. No.: 16/173,357

(22) Filed: Oct. 29, 2018

(65) Prior Publication Data

US 2020/0073878 A1 Mar. 5, 2020

(30) Foreign Application Priority Data

Aug. 31, 2018 (IN) .............................. 201841032760

(51) Int. Cl.
| | | |
|---|---|---|
| G06K 9/00 | (2006.01) | |
| G06F 16/31 | (2019.01) | |
| G06F 16/22 | (2019.01) | |
| G06F 40/163 | (2020.01) | |

(52) U.S. Cl.
CPC ........ *G06F 16/313* (2019.01); *G06F 16/2282* (2019.01); *G06F 40/163* (2020.01); *G06K 9/00449* (2013.01); *G06K 9/00456* (2013.01)

(58) Field of Classification Search
CPC .. G06F 16/2282; G06F 16/313; G06F 40/163; G06F 16/93; G06K 9/00449; G06K 9/00456; G06K 9/6211
See application file for complete search history.

(56) References Cited

U.S. PATENT DOCUMENTS

2010/0275112 A1* 10/2010 Bastos dos Santos ..................... G06F 40/174 715/227
2018/0276462 A1* 9/2018 Davis ..................... G06K 9/342

* cited by examiner

*Primary Examiner* — Irete F Ehichioya
*Assistant Examiner* — Xiaoqin Hu
(74) *Attorney, Agent, or Firm* — Plumsea Law Group, LLC

(57) ABSTRACT

A system and method for extracting structured information from an implicit table is disclosed. The system and method provide a way to locate and categorize structured information from an implicit table. More specifically, the system and method provide a way of determining which part of an input image document includes a dominant table and which parts of the dominant table make up rows and columns. These details give meaning to the structured information of the implicit table. These details can be used to properly place the structured information from the implicit table into a two-dimensional data structure, such as a data structure in a relational database. In other words, the structured information from a scanned or digital Portable Document Format (PDF) document can be extracted and placed into a useful format, such as a relational database.

20 Claims, 14 Drawing Sheets

| PATIENT NAME | PATIENT PHONE NUMBER | PATIENT GENDER | PATIENT MARITAL STATUS |
|---|---|---|---|
| BOB BROWN | 555-555-1234 | MALE | SINGLE |
| GALE SMITH | 555-555-1235 | FEMALE | MARRIED |
| ANNA JONES | 555-555-1236 | FEMALE | SINGLE |
| JOHN DOE | 555-555-1237 | MALE | MARRIED |

FIG. 1

| PATIENT NAME | PATIENT PHONE NUMBER | PATIENT GENDER | PATIENT MARITAL STATUS |
|---|---|---|---|
| BOB BROWN | 555-555-1234 | MALE | SINGLE |
| GALE SMITH | 555-555-1235 | FEMALE | MARRIED |
| ANNA JONES | 555-555-1236 | FEMALE | SINGLE |
| JOHN DOE | 555-555-1237 | MALE | MARRIED |

FIG. 2

Smith Optometry  INVOICE

1111 MAIN STREET
SMITHTOWN, VA 77777
PHONE: 555-555-1234

INVOICE #100
DATE: MAY 1, 2019

TO:
BOB SMITH
1200 CENTER ST.
SMITHTOWN, VA 77777
555-555-1245

400

| SERVICE DATE REFERENCE | QUANTITY | UNIT PRICE | TOTAL |
|---|---|---|---|
| COMPREHENSIVE EXAM | 1 | 85.00 | 85.00 |
| REFRACTION | 1 | 20.00 | 20.00 |
| CONTACT LENS FIT | 1 | 55.00 | 55.00 |
| 90pk CONTACT LENSES | 3 | 60.00 | 180.00 |
| | | SUBTOTAL | 340.00 |
| | | SALES TAX | 27.20 |
| | | SHIPPING & HANDLING | 10.00 |
| | | TOTAL DUE | 377.20 |

MAKE ALL CHECKS PAYABLE TO SMITH OPTOMETRY.
IF YOU HAVE ANY QUESTIONS CONCERNING
THIS INVOICE, CONTACT: YOUR NAME AT 555-555-1234.

THANK YOU FOR YOUR BUSINESS!

FIG. 4

| Smith | Optometry |

| INVOICE |

| 1111 | MAIN | STREET |
| SMITHTOWN, | VA | 77777 |
| PHONE: | 555 | 555 | 1234 |

| INVOICE | #100 |
| DATE: | MAY | 1, | 2019 |

| TO: |
| BOB | SMITH |
| 1200 | CENTER | ST. |
| SMITHTOWN, | VA | 77777 |
| 555 | 555 | 1245 |

400

| SERVICE DATE REFERENCE | QUANTITY | UNIT PRICE | TOTAL |
|---|---|---|---|
| COMPREHENSIVE EXAM | 1 | 85.00 | 85.00 |
| REFRACTION | 1 | 20.00 | 20.00 |
| CONTACT LENS FIT | 1 | 55.00 | 55.00 |
| 90pk CONTACT LENSES | 3 | 60.00 | 180.00 |
| | | SUBTOTAL | 340.00 |
| | | SALES TAX | 27.20 |
| | SHIPPING & HANDLING | | 10.00 |
| | | TOTAL DUE | 377.20 |

| MAKE | ALL | CHECKS | PAYABLE | TO | SMITH | OPTOMETRY. |
| IF | YOU | HAVE | ANY | QUESTIONS | CONCERNING |
| THIS | INVOICE, | CONTACT: | YOUR | NAME | AT | 555 | 555 | 1234. |

| THANK | YOU | FOR | YOUR | BUSINESS! |

FIG. 5

Smith Optometry                                      INVOICE

~~1111 MAIN STREET~~                          ~~INVOICE #100~~
~~SMITHTOWN, VA 77777~~             ~~DATE: MAY 1, 2019~~
~~PHONE: 555-555-1234~~

~~TO:~~
~~BOB SMITH~~
~~1200 CENTER ST.~~
~~SMITHTOWN, VA 77777~~
~~555-555-1245~~

400

| ~~SERVICE DATE~~ ~~REFERENCE~~ | ~~QUANTITY~~ | ~~UNIT PRICE~~ | ~~TOTAL~~ |
|---|---|---|---|
| ~~COMPREHENSIVE EXAM~~ | ~~1~~ | ~~85.00~~ | ~~85.00~~ |
| ~~REFRACTION~~ | ~~1~~ | ~~20.00~~ | ~~20.00~~ |
| ~~CONTACT LENS FIT~~ | ~~1~~ | ~~55.00~~ | ~~55.00~~ |
| ~~90pk CONTACT LENSES~~ | ~~3~~ | ~~60.00~~ | ~~180.00~~ |
|  |  | ~~SUBTOTAL~~ | ~~340.00~~ |
|  |  | ~~SALES TAX~~ | ~~27.20~~ |
|  | ~~SHIPPING & HANDLING~~ |  | ~~10.00~~ |
|  |  | ~~TOTAL DUE~~ | ~~377.20~~ |

~~MAKE ALL CHECKS PAYABLE TO SMITH OPTOMETRY.~~
~~IF YOU HAVE ANY QUESTIONS CONCERNING~~
~~THIS INVOICE, CONTACT: YOUR NAME AT 555-555-1234.~~

~~THANK YOU FOR YOUR BUSINESS!~~

FIG. 6

Smith Optometry                                         INVOICE

| 1111 | MAIN | STREET |
|---|---|---|
| SMITHTOWN, | VA | 77777 |
| PHONE: | 555-555-1234 | |

| INVOICE | #100 |
|---|---|
| DATE: MAY | 1, 2019 |

TO:
BOB SMITH
1200 CENTER ST.
SMITHTOWN, VA  77777
555-555-1245

*400*

| SERVICE DATE REFERENCE | QUANTITY | UNIT PRICE | TOTAL |
|---|---|---|---|
| COMPREHENSIVE EXAM | 1 | 85.00 | 85.00 |
| REFRACTION | 1 | 20.00 | 20.00 |
| CONTACT LENS FIT | 1 | 55.00 | 55.00 |
| 90pk CONTACT LENSES | 3 | 60.00 | 180.00 |
| | | SUBTOTAL | 340.00 |
| | | SALES TAX | 27.20 |
| | SHIPPING & HANDLING | | 10.00 |
| | | TOTAL DUE | 377.20 |

MAKE ALL CHECKS PAYABLE TO SMITH OPTOMETRY.
IF YOU HAVE ANY QUESTIONS CONCERNING
THIS INVOICE, CONTACT: YOUR NAME AT 555-555-1234.

THANK YOU FOR YOUR BUSINESS!

FIG. 7

Smith Optometry               INVOICE

1111 MAIN STREET                  INVOICE #100
SMITHTOWN, VA 77777               DATE: MAY 1, 2019
PHONE: 555-555-1234

TO:
BOB SMITH
1200 CENTER ST.
SMITHTOWN, VA 77777
555-555-1245
                                        400

| SERVICE DATE REFERENCE | QUANTITY | UNIT PRICE | TOTAL |
|---|---|---|---|
| COMPREHENSIVE EXAM | 1 | 85.00 | 85.00 |
| REFRACTION | 1 | 20.00 | 20.00 |
| CONTACT LENS FIT | 1 | 55.00 | 55.00 |
| 90pk CONTACT LENSES | 3 | 60.00 | 180.00 |

|  |  |
|---|---|
| SUBTOTAL | 340.00 |
| SALES TAX | 27.20 |
| SHIPPING & HANDLING | 10.00 |
| TOTAL DUE | 377.20 |

MAKE ALL CHECKS PAYABLE TO SMITH OPTOMETRY.
IF YOU HAVE ANY QUESTIONS CONCERNING
THIS INVOICE, CONTACT: YOUR NAME AT 555-555-1234.

THANK YOU FOR YOUR BUSINESS!

FIG. 8

Smith Optometry

1111 MAIN STREET
SMITHTOWN, VA 77777
PHONE: 555-555-1234

TO:
BOB SMITH
1200 CENTER ST.
SMITHTOWN, VA 77777
555-555-1245

INVOICE

INVOICE #100
DATE: MAY 1, 2019

1004
1006
400

| SERVICE DATE REFERENCE | QUANTITY | UNIT PRICE | TOTAL |
|---|---|---|---|
| COMPREHENSIVE EXAM | 1 | 85.00 | 85.00 |
| REFRACTION | 1 | 20.00 | 20.00 |
| CONTACT LENS FIT | 1 | 55.00 | 55.00 |
| 90pk CONTACT LENSES | 3 | 60.00 | 180.00 |
|  |  | SUBTOTAL | 340.00 |
|  |  | SALES TAX | 27.20 |
|  |  | SHIPPING & HANDLING | 10.00 |
|  |  | TOTAL DUE | 377.20 |

1002
1000

MAKE ALL CHECKS PAYABLE TO SMITH OPTOMETRY.
IF YOU HAVE ANY QUESTIONS CONCERNING
THIS INVOICE, CONTACT: YOUR NAME AT 555-555-1234.

THANK YOU FOR YOUR BUSINESS!

| 1100 → SECURITY | SHARES | 1102 → PRICE | MARKET VALUE ($M) | 1104 → % OF PORT | LATEST 12 MOS FY | 2001 | 2002 EST | %CHG | 2002 EST P/E |
|---|---|---|---|---|---|---|---|---|---|
| CO. 1 | XXXXX | XX.XX | XXXXX.X | X.X | X.XX | X.XX | X.XX | X.XX | X.XX |
| CO. 2 | XXXXX | XX.XX | XXXXX.X | X.X | X.XX | X.XX | X.XX | X.XX | X.XX |
| CO. 3 | XXXXX | XX.XX | XXXXX.X | X.X | X.XX | X.XX | X.XX | X.XX | X.XX |
| CO. 4 | XXXXX | XX.XX | XXXXX.X | X.X | X.XX | X.XX | X.XX | X.XX | X.XX |
| CO. 5 | | | | | | | | | |
| SUBTOTAL OF TOP 5 | | | XXXXX.X | XX.X | | | | X.XX | X.XX |
| CO. 6 | XXXXX | XX.XX | XXXXX.X | X.X | X.XX | X.XX | X.XX | X.XX | X.XX |
| CO. 7 | XXXXX | XX.XX | XXXXX.X | X.X | X.XX | X.XX | X.XX | X.XX | X.XX |
| CO. 8 | XXXXX | XX.XX | XXXXX.X | X.X | X.XX | X.XX | X.XX | X.XX | X.XX |
| CO. 9 | XXXXX | XX.XX | XXXXX.X | X.X | X.XX | X.XX | X.XX | X.XX | X.XX |
| CO. 10 | | | | | | | | | |
| SUBTOTAL OF TOP 10 | | | XXXXX.X | XX.X | | | | X.XX | X.XX |

| SECURITY | SHARES | PRICE | MARKET VALUE ($M) | % OF PORT | LATEST 12 MOS FY | 2001 | 2002 EST | %CHG | 2002 EST P/E |
|---|---|---|---|---|---|---|---|---|---|
| CO. 1 | XXXXX | XX.XX | XXXXX.X | X.X | X.XX | X.XX | X.XX | X.XX | X.XX |
| CO. 2 | XXXXX | XX.XX | XXXXX.X | X.X | X.XX | X.XX | X.XX | X.XX | X.XX |
| CO. 3 | XXXXX | XX.XX | XXXXX.X | X.X | X.XX | X.XX | X.XX | X.XX | X.XX |
| CO. 4 | XXXXX | XX.XX | XXXXX.X | X.X | X.XX | X.XX | X.XX | X.XX | X.XX |
| CO. 5 | XXXXX | XX.XX | XXXXX.X | X.X | X.XX | X.XX | X.XX | X.XX | X.XX |
| SUBTOTAL OF TOP 5 | | | XXXXX.X | XX.X | | | | X.XX | X.XX |
| CO. 6 | XXXXX | XX.XX | XXXXX.X | X.X | X.XX | X.XX | X.XX | X.XX | X.XX |
| CO. 7 | XXXXX | XX.XX | XXXXX.X | X.X | X.XX | X.XX | X.XX | X.XX | X.XX |
| CO. 8 | XXXXX | XX.XX | XXXX.X | X.X | X.XX | X.XX | X.XX | X.XX | X.XX |
| CO. 9 | XXXXX | XX.XX | XXXX.X | X.X | X.XX | X.XX | X.XX | X.XX | X.XX |
| CO. 10 | XXXXX | XX.XX | XXXX.X | X.X | X.XX | X.XX | X.XX | X.XX | X.XX |
| SUBTOTAL OF TOP 10 | | | XXXXX.X | XX.X | | | | X.XX | X.XX |

1204 1206 1200

| SECURITY | SHARES | PRICE | MARKET VALUE ($M) | % OF PORT | LATEST 12 MOS FY | 2001 | 2002 EST | %CHG | 2002 EST P/E |
|---|---|---|---|---|---|---|---|---|---|
| CO. 11 | XXXXX | XX.XX | XXXXX.X | X.X | X.XX | X.XX | X.XX | X.XX | X.XX |
| CO. 12 | XXXXX | XX.XX | XXXXX.X | X.X | X.XX | X.XX | X.XX | X.XX | X.XX |
| CO. 13 | XXXXX | XX.XX | XXXXX.X | X.X | X.XX | X.XX | X.XX | X.XX | X.XX |
| CO. 14 | XXXXX | XX.XX | XXXXX.X | X.X | X.XX | X.XX | X.XX | X.XX | X.XX |
| CO. 15 | XXXXX | XX.XX | XXXXX.X | X.X | X.XX | X.XX | X.XX | X.XX | X.XX |
| SUBTOTAL OF TOP 15 | | | XXXXX.X | XX.X | | | | X.XX | X.XX |
| CO. 16 | XXXXX | XX.XX | XXXXX.X | X.X | X.XX | X.XX | X.XX | X.XX | X.XX |
| CO. 17 | XXXXX | XX.XX | XXXXX.X | X.X | X.XX | X.XX | X.XX | X.XX | X.XX |
| CO. 18 | XXXXX | XX.XX | XXXX.X | X.X | X.XX | X.XX | X.XX | X.XX | X.XX |
| CO. 19 | XXXXX | XX.XX | XXXX.X | X.X | X.XX | X.XX | X.XX | X.XX | X.XX |
| CO. 20 | XXXXX | XX.XX | XXXX.X | X.X | X.XX | X.XX | X.XX | X.XX | X.XX |
| SUBTOTAL OF TOP 20 | | | XXXXX.X | XX.X | | | | X.XX | X.XX |

1208 1210 1202

| SECURITY | SHARES | PRICE | MARKET VALUE ($M) | % OF PORT | LATEST 12 MOS FY | 2001 | 2002 EST | %CHG | 2002 EST P/E |
|---|---|---|---|---|---|---|---|---|---|
| CO. 21 | XXXXX | XX.XX | XXXXX.X | X.X | X.XX | X.XX | X.XX | X.XX | X.XX |
| CO. 22 | XXXXX | XX.XX | XXXXX.X | X.X | X.XX | X.XX | X.XX | X.XX | X.XX |
| CO. 23 | XXXXX | XX.XX | XXXXX.X | X.X | X.XX | X.XX | X.XX | X.XX | X.XX |
| CO. 24 | XXXXX | XX.XX | XXXXX.X | X.X | X.XX | X.XX | X.XX | X.XX | X.XX |
| CO. 25 | XXXXX | XX.XX | XXXXX.X | X.X | X.XX | X.XX | X.XX | X.XX | X.XX |
| SUBTOTAL OF TOP 25 | | | XXXXX.X | XX.X | | | | X.XX | X.XX |
| CO. 26 | XXXXX | XX.XX | XXXXX.X | X.X | X.XX | X.XX | X.XX | X.XX | X.XX |
| CO. 27 | XXXXX | XX.XX | XXXXX.X | X.X | X.XX | X.XX | X.XX | X.XX | X.XX |
| CO. 28 | XXXXX | XX.XX | XXXX.X | X.X | X.XX | X.XX | X.XX | X.XX | X.XX |
| CO. 29 | XXXXX | XX.XX | XXXX.X | X.X | X.XX | X.XX | X.XX | X.XX | X.XX |
| CO. 30 | XXXXX | XX.XX | XXXX.X | X.X | X.XX | X.XX | X.XX | X.XX | X.XX |
| SUBTOTAL OF TOP 30 | | | XXXXX.X | XX.X | | | | X.XX | X.XX |

| SECURITY | SHARES | PRICE | MARKET VALUE ($M) | % OF PORT | LATEST 12 MOS FY | 2001 | 2002 EST | %CHG | 2002 EST P/E |
|---|---|---|---|---|---|---|---|---|---|
| CO. 1 | XXXXX | XX.XX | XXXXX.X | X.X | X.XX | X.XX | X.XX | X.XX | X.XX |
| CO. 2 | XXXXX | XX.XX | XXXXX.X | X.X | X.XX | X.XX | X.XX | X.XX | X.XX |
| CO. 3 | XXXXX | XX.XX | XXXXX.X | X.X | X.XX | X.XX | X.XX | X.XX | X.XX |
| CO. 4 | XXXXX | XX.XX | XXXXX.X | X.X | X.XX | X.XX | X.XX | X.XX | X.XX |
| CO. 5 | XXXXX | XX.XX | XXXXX.X | X.X | X.XX | X.XX | X.XX | X.XX | X.XX |
| SUBTOTAL OF TOP 5 | | | XXXXX.X | XX.X | | | | X.XX | X.XX |
| CO. 6 | XXXXX | XX.XX | XXXXX.X | X.X | X.XX | X.XX | X.XX | X.XX | X.XX |
| CO. 7 | XXXXX | XX.XX | XXXXX.X | X.X | X.XX | X.XX | X.XX | X.XX | X.XX |
| CO. 8 | XXXXX | XX.XX | XXXX.X | X.X | X.XX | X.XX | X.XX | X.XX | X.XX |
| CO. 9 | XXXXX | XX.XX | XXXX.X | X.X | X.XX | X.XX | X.XX | X.XX | X.XX |
| CO. 10 | XXXXX | XX.XX | XXXX.X | X.X | X.XX | X.XX | X.XX | X.XX | X.XX |
| SUBTOTAL OF TOP 10 | | | XXXXX.X | XX.X | | | | X.XX | X.XX |

1300
1302 1304

| SECURITY | SHARES | PRICE | MARKET VALUE ($M) | % OF PORT | LATEST 12 MOS FY | 2001 | 2002 EST | %CHG | 2002 EST P/E |
|---|---|---|---|---|---|---|---|---|---|
| CO. 1 | XXXXX | XX.XX | XXXXX.X | X.X | X.XX | X.XX | X.XX | X.XX | X.XX |
| CO. 2 | XXXXX | XX.XX | XXXXX.X | X.X | X.XX | X.XX | X.XX | X.XX | X.XX |
| CO. 3 | XXXXX | XX.XX | XXXXX.X | X.X | X.XX | X.XX | X.XX | X.XX | X.XX |
| CO. 4 | XXXXX | XX.XX | XXXXX.X | X.X | X.XX | X.XX | X.XX | X.XX | X.XX |
| CO. 5 | XXXXX | XX.XX | XXXXX.X | X.X | X.XX | X.XX | X.XX | X.XX | X.XX |
| SUBTOTAL OF TOP 5 | | | XXXXX.X | XX.X | | | | X.XX | X.XX |
| CO. 6 | XXXXX | XX.XX | XXXXX.X | X.X | X.XX | X.XX | X.XX | X.XX | X.XX |
| CO. 7 | XXXXX | XX.XX | XXXXX.X | X.X | X.XX | X.XX | X.XX | X.XX | X.XX |
| CO. 8 | XXXXX | XX.XX | XXXX.X | X.X | X.XX | X.XX | X.XX | X.XX | X.XX |
| CO. 9 | XXXXX | XX.XX | XXXX.X | X.X | X.XX | X.XX | X.XX | X.XX | X.XX |
| CO. 10 | XXXXX | XX.XX | XXXX.X | X.X | X.XX | X.XX | X.XX | X.XX | X.XX |
| SUBTOTAL OF TOP 10 | | | XXXXX.X | XX.X | | | | X.XX | X.XX |

FIG. 13

SYSTEM AND METHOD FOR EXTRACTING STRUCTURED INFORMATION FROM IMPLICIT TABLES

CROSS-REFERENCE TO RELATED APPLICATION

This application claims priority to Indian Provisional Patent Application Number 201841032760, filed Aug. 31, 2018 (Attorney Docket No. 164-1013), the disclosure of which is hereby incorporated by reference.

TECHNICAL FIELD

The present disclosure generally relates to extracting structured information from tables. More specifically, the present disclosure generally relates to a system and method for extracting structured information from implicit tables.

BACKGROUND

Tables are textual representations of structured information. Explicit tables use gridlines to define rows and columns. Gridlines give structure and definition to the text. FIG. 1 shows an example of an explicit table 100. As shown in FIG. 1, table 100 includes vertical gridlines, such as a first vertical gridline 102, and horizontal gridlines, such as a first horizontal gridline 104. The vertical gridlines define columns and the horizontal gridlines define rows.

Implicit tables, on the other hand, are tables that do not include visible guidelines, and instead only create rows and columns with the arrangement of text. For example, the same table from FIG. 1 is shown as an implicit table 200 in FIG. 2. Table 200 does not include a plurality of horizontal and vertical gridlines defining rows and columns. Rather table 200 includes a single line 202 that only separates the headers of the columns from the rest of the information listed in the columns. Without gridlines, the text is difficult to divide into categories defined by the rows and columns. Treating an implicit table as plain text leads to a misrepresentation of information content. In particular, when a table does not have visible gridlines, only text is available without more information about what the text represents.

There is a need in the art for a system and method that addresses the shortcomings discussed above.

SUMMARY

A system and method for extracting structured information from an implicit table is disclosed. The system and method provide a way to locate and categorize structured information from an implicit table. More specifically, the system and method provide a way of determining which part of an input image document includes a dominant table and which parts of the dominant table make up rows and columns. These details give meaning to the structured information of the implicit table. These details can be used to properly place the structured information from the implicit table into a two-dimensional data structure, such as a data structure in a relational database. In other words, the structured information from a scanned or digital Portable Document Format (PDF) document can be extracted and placed into a useful format, such as a relational database.

In the context of this disclosure, "structured information" refers to information that is structured by its placement in various fields in an input image document. For example, the placement of information in a column may identify the information in the column as belonging to a category defined by a header of the column. Similarly, the placement of information in a row may identify that the information in the row is related to each other.

The disclosed system and method improves the extraction of structured information from tables by providing a way to extract structured information from implicit tables. For example, the method of extracting structured information from implicit tables may include identifying rows and columns, such that the structure of the information from the implicit table may be categorized. This categorization makes it possible to automatically populate a two-dimensional data structure with the structured information from the implicit table.

The disclosed system and method improves the process of comparing rows of an implicit table with one another by using a set of features representing a row and describing the set of features as a feature vector. The feature vector simplifies the description of the features such that comparing the features of individual rows is more streamlined.

The disclosed system and method improves comparing features of rows of an implicit table with one another by using a line representation of each of the rows. Comparing the line representation of each of the rows increases the efficiency of comparing the content distribution between two dominant rows. This process is very simple and easy to visualize in juxtaposition with comparing specific words in each row.

The disclosed system and method makes it convenient to quickly and easily extract data from scanned images, such that scanned images of very old documents may suddenly become usable as data sources. For example, in some embodiments, the method of extracting structured information from implicit tables may include identifying dominant rows of an implicit table. To help identify dominant rows, words in a text from an input image document containing an implicit table may be identified by analyzing height and width statistics of the text. In such embodiments, the words in the text can be identified without knowing the meaning of the words. Accordingly, the method of extracting structured information can be performed with or without optical character recognition. In other words, the method of extracting structured information can be performed for both digital and scanned images (e.g., scanned images of documents from 50 years ago).

Similar to using the height and width statistics of text to identify the words in text, a maximum height difference may be used to determine whether a row belongs to a dominant table. Rows belonging to the dominant table typically have fonts that do not vary much. Thus, rows with text exceeding a predetermined maximum height difference threshold likely do not belong to the dominant table. Because of this fact, the maximum height difference threshold may be used to filter out rows that are not dominant rows. Because the meaning of the words of the text is unnecessary for this process of filtering, the method of extracting structured information can be performed for both digital and scanned images (e.g., scanned images of documents from 50 years ago).

In one aspect, the disclosure provides a method of extracting structured information from an implicit table. The method may include obtaining a first input image document containing an implicit table. The first input image document may include text. The method may include identifying words in the text. The method may include identifying a first dominant row of text and a second dominant row of text; determining a first set of features for the first dominant row. The method may include determining a second set of features for the second dominant row. The method may include comparing the first set of features with the second set of features to determine a measure of similarity between the first set of features with the second set of features, The method may include determining that the first dominant row and the second dominant row are part of a cluster of rows based on a determination that the measure of similarity between the first set of features and the second set of features exceeds a predetermined threshold similarity value. The method may include comparing a first spatial position of a first white space of the first dominant row with a second spatial position of a second white space of the second dominant row. The method may include determining a white space confidence rating based on the comparison between the first spatial position of the first white space of the first dominant row with the second spatial position of the second white space of the second dominant row. The method may include generating a first column separator line for the first dominant row and the second dominant row based upon the white space confidence rating. The method may include populating a two-dimensional data structure using the at least two dominant rows and the column separator lines.

In another aspect, the disclosure provides a non-transitory computer-readable medium storing software comprising instructions that may be executable by one or more device processors to extract structured information from implicit tables by: obtaining a first input image document containing an implicit table and text; identifying words in the text; identifying a first dominant row of text and a second dominant row of text; determining a first set of features for the first dominant row; determining a second set of features for the second dominant row; comparing the first set of features with the second set of features to determine a measure of similarity between the first set of features with the second set of features; determining that the first dominant row and the second dominant row are part of a cluster of rows based on a determination that the measure of similarity between the first set of features and the second set of features exceeds a predetermined threshold similarity value; comparing a first spatial position of a first white space of the first dominant row with a second spatial position of a second white space of the second dominant row; determining a white space confidence rating based on the comparison between the first spatial position of the first white space of the first dominant row with the second spatial position of the second white space of the second dominant row; generating a first column separator line for the first dominant row and the second dominant row based upon the white space confidence rating; and populating a two-dimensional data structure using the at least two dominant rows and the column separator lines.

In yet another aspect, the disclosure provides a system for extracting structured information from image documents. The system may comprise a device processor and a non-transitory computer readable medium storing instructions. The instructions may be executable by the device processor to: obtain a first input image document containing an implicit table and text; identify words in the text; identify a first dominant row of text and a second dominant row of text; determine a first set of features for the first dominant row; determine a second set of features for the second dominant row; compare the first set of features with the second set of features to determine a measure of similarity between the first set of features with the second set of features; determine that the first dominant row and the second dominant row are part of a cluster of rows based on a determination that the measure of similarity between the first set of features and the second set of features exceeds a predetermined threshold similarity value; compare a first spatial position of a first white space of the first dominant row with a second spatial position of a second white space of the second dominant row; determine a white space confidence rating based on the comparison between the first spatial position of the first white space of the first dominant row with the second spatial position of the second white space of the second dominant row; generate a first column separator line for the first dominant row and the second dominant row based upon the white space confidence rating; and populate a two-dimensional data structure using the at least two dominant rows and the column separator lines.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted. This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 1 is a schematic diagram of an explicit table;

FIG. 2 is a schematic diagram of an implicit table;

FIG. 4 is a schematic diagram of a document including an implicit table;

FIG. 5 illustrates the document of FIG. 4 after bounding boxes have been applied to words;

FIG. 6 illustrates the document of FIG. 4 after general rows have been identified;

FIG. 7 illustrates the document of FIG. 4 after non-table rows have been filtered out;

FIG. 8 illustrates the document of FIG. 4 after dominant rows have been identified;

FIG. 10 illustrates the document of FIG. 4 after column separator lines have been generated;

FIG. 11 illustrates a first input image document;

FIG. 12 illustrates the first input image document of FIG. 11 with a second input image document and a third input image document;

FIG. 13 illustrates the first input image document of FIG. 11 edited to include new column separator lines.

DESCRIPTION OF EMBODIMENTS

Figure 3A:
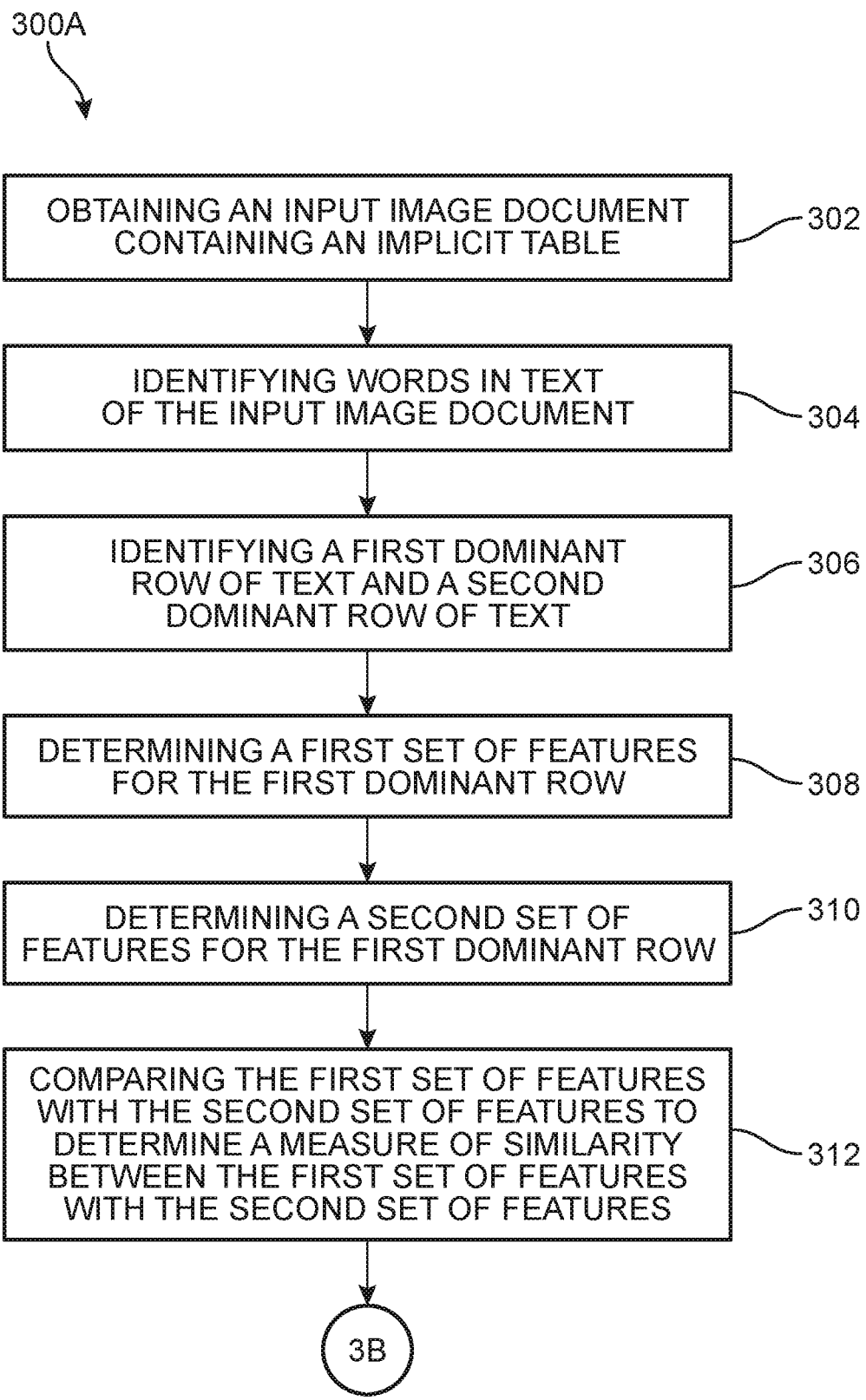
FIGS. 3A-3B are a flowchart illustrating a method for extracting structured information from an implicit table.
Figure 3B:
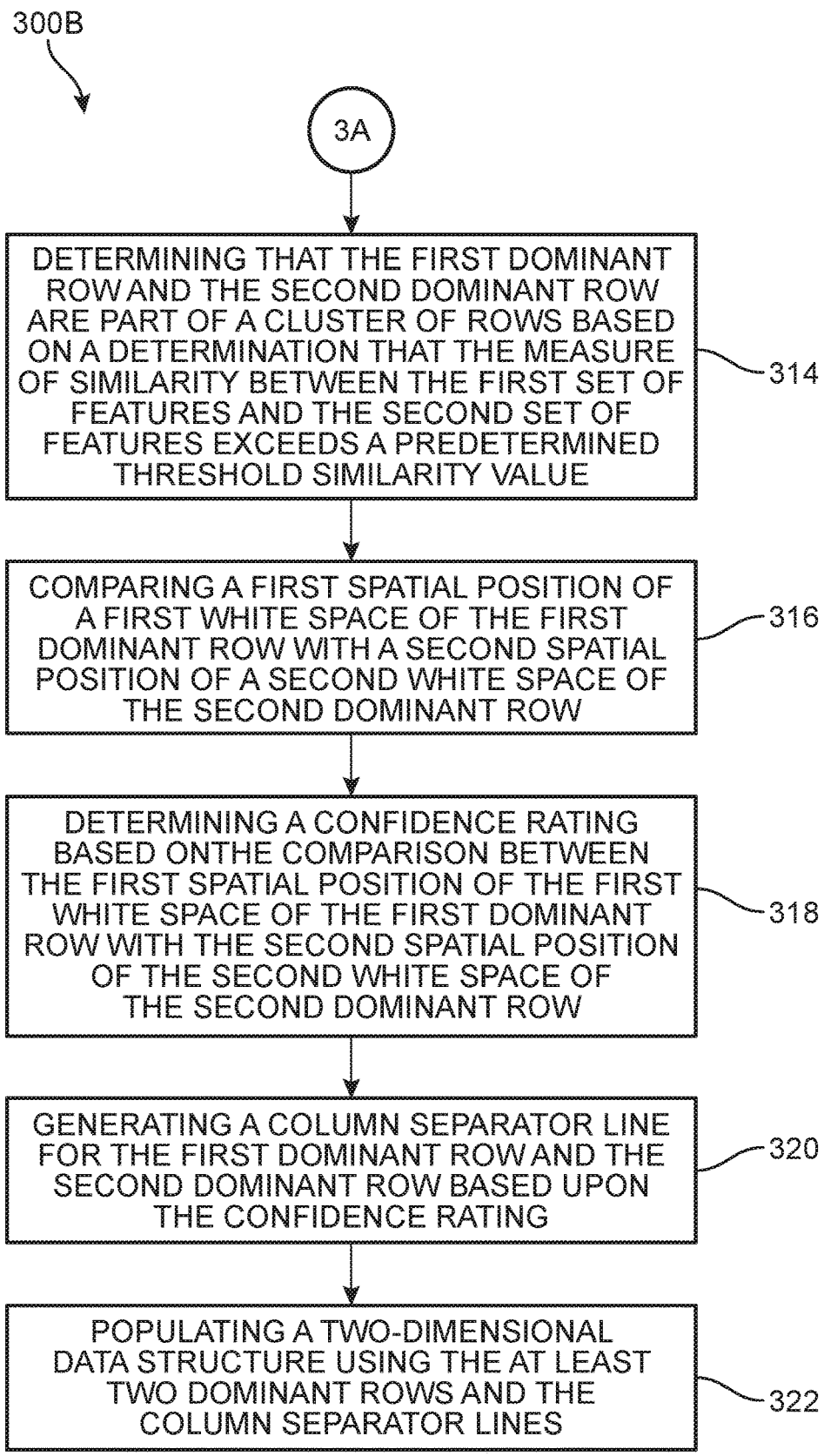

The following is an overview of the method of extracting structured information from implicit tables, which is discussed in more detail after the overview. It is understood that machine learning may be used to perform any steps of the method of extracting structured information from implicit tables. FIGS. 3A-3B are a flowchart of an example embodiment of a method of extracting structured information from implicit tables 300 (or method 300). For purposes of readability, the flowchart is divided into first portion of method 300A and second portion of method 300B. The method of extracting structured information from implicit tables may include obtaining an input image document (or image) containing an implicit table. For example, method 300 includes a step 302 of obtaining an input image document containing an implicit table. The input image document may include text. The method of extracting structured information from implicit tables may include identifying words on the input image document. For example, method 300 includes a step 304 of identifying words in text of the input image document. In some embodiments, this step may include finding and identifying the words on the input image document with bounding boxes. After identifying words in the text, the document may be analyzed to identify dominant rows. For example, method 300 may include a step 306 of identifying a first dominant row of text and a second dominant row of text. As discussed in more detail below, identifying dominant rows may include: filtering out text that is unlikely to form a general row; identifying general rows; and/or filtering out text that is unlikely to form a dominant row.

The method of extracting structured information from implicit tables may include determining a set of features for each of the dominant rows. For example, method 300 may include a step 308 of determining a first set of features for the first dominant row and a step 310 of determining a second set of features for the second dominant row. After determining a set of features for the dominant rows, the set of features for each dominant row may be compared with one another. For example, method 300 may include a step 312 of comparing the first set of features with the second set of features to determine a measure of similarity between the first set of features with the second set of features. The measure of similarity may be used to determine whether each of the dominant rows is part of a cluster of rows. For example, method 300 may include a step 314 of determining that the first dominant row and the second dominant row are part of a cluster of rows based on a determination that the measure of similarity between the first set of features and the second set of features exceeds a predetermined threshold similarity value. Ensuring that the dominant rows share a high measure of similarity helps in identifying which rows belong to the dominant table.

The method of extracting structured information from implicit tables may include comparing spatial positions of white spaces of the dominant rows with one another. For example, method 300 may include a step 316 of comparing a first spatial position of a first white space of the first dominant row with a second spatial position of a second white space of the second dominant row. Comparing spatial positions of white space ensures accuracy in locating columns by finding a consensus among the dominant rows.

The method of extracting structured information from implicit tables may include determining a white space confidence rating based on the comparison between the spatial positions of the white space(s) of each of the dominant rows. For example, method 300 may include a step 318 of determining a white space confidence rating based on the comparison between the first spatial position of the first white space of the first dominant row with the second spatial position of the second white space of the second dominant row.

The method of extracting structured information from implicit tables may include generating a column separator line for the dominant rows based on the white space confidence rating. For example, method 300 may include a step 320 of generating a column separator line for the first dominant row and the second dominant row based upon the white space confidence rating. The white space confidence rating helps in determining where to place the column separator line in this step. Placing the column separator lines is a way of identifying the columns of the dominant rows. In other words, the column separator lines define the boundaries of the columns.

Once the dominant rows and columns are identified, the structure of the implicit table (dominant table in the input image document) is known. The structure can be used to determine the placement of the structured information from the implicit table into a two-dimensional data structure. For example, method 300 may include step 322 of populating a two-dimensional data structure using the at least two dominant rows and the column separator lines.

This portion of the disclosure provides more details about the method of extracting structured information from implicit tables. As mentioned above, the method of extracting structured information from implicit tables may include obtaining an input image document containing an implicit table. The input image document may contain text within the implicit table as well as in portions outside the bounds of the implicit table. FIG. 4 shows an example of an input image document with an implicit table 400 including text, as well as other text that is not part of implicit table 400. The document in FIG. 4 is an invoice for an optometry business. Implicit table 400 includes the following headers, which are part of the text within implicit table 400: "Service Date Reference", "Quantity", "Unit Price", and "Total." The text beneath each of the headers makes up a column. For example, column with the header "Quantity" includes the following text: "1", "1", "1", and "3." As mentioned above, the input image document may contain text outside the bounds of the implicit table. For example, the input image document shown in FIG. 4 includes text outside the bounds of implicit table 400. This text outside the bounds of implicit table 400 includes, for example, "Thank you for your business!" and "Smith Optometry."

In some embodiments, obtaining an input image document may include obtaining a digitized form of the input image document, wherein the digitized form includes recognized characters or words and spatial locations of the recognized characters or words. In other embodiments, obtaining an input image document may include obtaining a scanned form of the input image document. It is understood that, in the context of this disclosure, text is characters horizontally spaced at regular intervals. Also, in the context of this disclosure, a word is a group of text that is spaced apart with smaller intervals than the rest of the text.

As previously mentioned, the method of extracting structured information from implicit tables may include identifying words in the text. The words may be identified by putting bounding boxes around the words. A bounding box is a subset of an image containing the object of interest. FIG. 5 shows the result of placing bounding boxes around identified words. In some embodiments, optical character recognition may be used to detect the words in the text. Then, the words can be retrieved and identified by putting bounded boxes around the words. In other embodiments, the words in the text may be detected by analyzing the height and width statistics. In some embodiments, the words in the text can be identified without knowing the meaning of the words. Due the various features used to detect table rows, including the height and width statistics of the words, the method of extracting structured information can be performed with or without optical character recognition. In other words, the method of extracting structured information can be performed for both digital and scanned images.

As previously mentioned, the method of extracting structured information from implicit tables may include identifying dominant rows. In the context of this disclosure, dominant rows may include horizontal rows belonging to a dominant table of an input image document. The dominant table may include the main and/or largest table of an input image document. The dominant table in the embodiment of FIGS. 4-8 and 10 includes implicit table 400. Identifying dominant rows may include filtering out portions of the input image document. In other words, the text falling outside the bounds of the dominant table may be filtered out (e.g., removed from consideration). Filtering out text falling outside the bounds of the dominant table may include filtering out text having certain characteristics. For example, in some embodiments, identifying dominant rows may include filtering out text by height and width statistics of characters or words. In another example, identifying dominant rows may include filtering out non-table rows.

Filtering by height and width statistics may include analyzing height and width statistics of characters or words. Characters or words having a height or width greater than corresponding upper height or width thresholds are likely noise. These upper thresholds can be based on the height and width statistics of the characters or words. Accordingly, any words having a height or width greater than the upper height or width thresholds, respectively, can be filtered out (e.g., removed from consideration). Similarly, any character components having a height or width smaller than corresponding lower height or width thresholds are likely noise. These lower thresholds can be based on the height and width statistics of the characters or words. Accordingly, any words having a height or width smaller than the lower height or width thresholds, respectively, can be filtered out (e.g., removed from consideration). In some embodiments, the height and width statistics upon which the upper and lower height and width thresholds are based may include, for example, averages and/or ranges of heights and widths found in the input document image.

In some embodiments, identifying dominant rows may include clustering words that fall in the same line. For example, FIG. 6 shows the document of FIG. 4 with horizontal lines appearing where more than one word is detected in the document. Clustering words that fall in the same line identifies general rows, which may or may not include dominant rows. Different types of filtering may be done to find dominant rows among the general rows. For example, as discussed below, non-table rows may be filtered out from the general rows to come closer to finding dominant rows. When identifying dominant rows, a row detector may find bounding boxes, such as those shown in FIG. 4, that fall in the same line. In such a case, the row detector does not need to find the actual words and can simply use the bounding boxes as landmarks indicating the spatial position, or location, of words.

As mentioned above, in some embodiments, identifying dominant rows may include filtering out non-table rows. In the context of this disclosure, non-table rows are rows that do not form part of a table. For example, as shown in FIG. 7, the rows that do not likely form part of a table do not have bounding boxes around them. Filtering out non-table rows can include filtering out rows that do not have any tabs. The spacing between characters can be analyzed to determine the size of a spacing between words on a line and the size of a tab between columns. The mode of the spacing between words can give an estimate of word separation. For example, in some embodiments, word separation can be estimated as being between 10 and 20 pixels. In some embodiments, the spacing between words can be estimated by the median height of all the connected components within the image. This estimation can be dynamic. Typically, the size of a tab is larger than the spacing between words, and the number of tab characters (e.g., space between columns) is less than the number of space characters (e.g., spaces between words). Using this information, the approximate size of a space between words and the approximate size of a tab between columns can be determined. Using these approximate sizes, the rows containing tabs can be considered table rows.

In some embodiments, identifying dominant rows may include filtering out rows having less than three columns (e.g., rows with two or more tab spaces). For example, FIG. 8 shows the document of FIG. 4 with bounding boxes around words belonging to rows having three or more columns. The words without bounding boxes have been filtered out. In some embodiments, filtering out rows having less than three columns can be performed subsequent filtering out non-table rows. In other embodiments, filtering out rows having less than three columns can be performed in place of filtering out non-table rows. In some embodiments, rows having a different number of columns may be filtered out as not belonging to a dominant table. For example, identifying dominant rows may include filtering out rows having less than two columns or filtering out rows having less than four columns. Identifying dominant rows may include using tab spacings to determine where columns are separated from one another.

As previously stated, the method of extracting structured information from implicit tables may include determining a set of features representing each of the dominant rows. Machine learning may be performed to determine a set of features representing each of the dominant rows. The features discussed below are the individual features of the row that may be included in the set of features representing the rows. In some embodiments, all of the below features are included in the set of features representing a row. In other embodiments, only a portion of the below features are included in the set of features representing a row. The set of features representing a row may be represented as a feature vector to simplify the description of the features such that comparing the features of individual rows is more streamlined.

In some embodiments, the features representing a row may include row height. The row height includes the horizontal span of a row. In some embodiments, the features representing a row may include row width. The row width includes the vertical span of a row.

In some embodiments, the features representing a row may include mean word spacings. The word spacings include the horizontal separation of the words in the row. This spacing can be the same for different font sizes. The variance of the spacing is typically very low (e.g., less than 5). In some embodiments, the features representing a row may include the standard deviation of word spacings.

In some embodiments, the features representing a row may include row content type. Whether the row has pure textual content or mixed (e.g., numeric and textual) is helpful for finding column headers.

Figure 9:
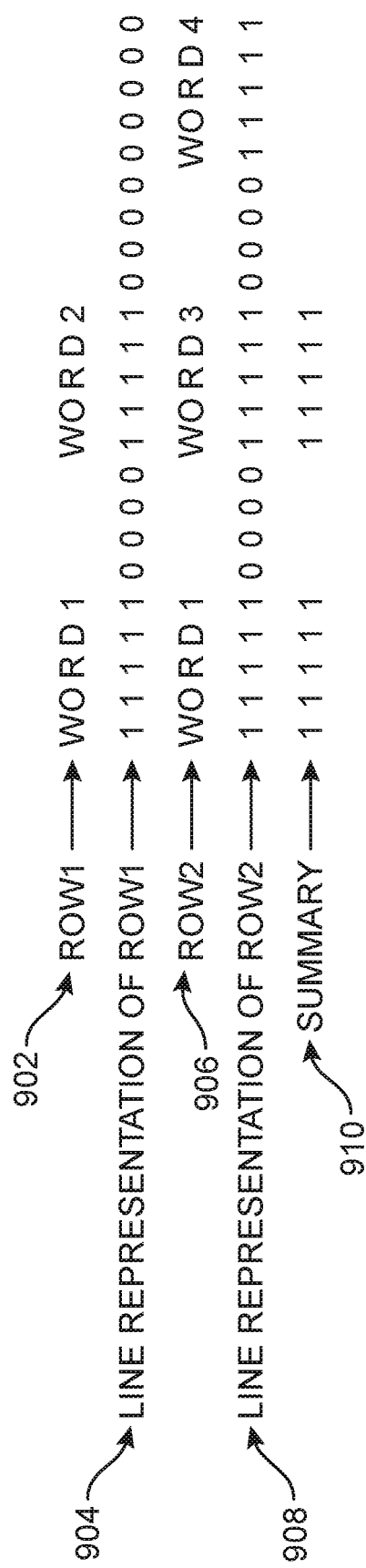
FIG. 9 illustrates shows how a line representation of a row is formed.

In some embodiments, the features representing a row may include line representation of the row. A line representation of a row may be described as a binary vector (L) of dimension (Row Width,1) where L(i)=1. The position in left to right is x. The position top to bottom is y. If there is a word present at the location x=i along the row, a 1 is used to mark the location. The line representation of a row shows whether or not there is a word at a certain position along a row. 1's are used to detect characters and 0s are used to detect white spaces. For example, FIG. 9 shows how a line representation of a row is formed. As shown in FIG. 9, Row 1 is indicated by reference number 902 and Row 2 is indicated by reference number 904. Row 1 is above Row 2. FIG. 9 shows how a line representation of a row is determined. Reference number 904 indicates a line representation of Row 1 and reference number 908 indicates a line representation of Row 2. In the line representation of Row 1, a 1 is present beneath each character of "word 1" and "word 2" and a 0 is present beneath each white space of Row 1. In the line representation of Row 2, a 1 is present beneath each character of "word 1", "word 3", and "word 4" and a 0 is present beneath each white space of Row 1. Determining a line representation of a row happens at a pixel level.

In some embodiments, the features representing a row may include an estimated number of columns. As discussed above with respect to FIG. 7, the statistical analysis of the word spacings along a row can be used to determine the size of a spacing between words and the size of a tab characters. In some embodiments, estimating a number of columns may include creating and using a statistical model that uses mode (maximum frequency of spacing) to create likelihood of word spacing. Likelihood of word spacing is an estimate of word spacing.

In some embodiments, the features representing a row may include a running text indicator. In the context of this disclosure, running text includes horizontal rows lacking column separations. If the mean separation between words is less than a predetermined threshold and the standard deviation is also less than a very low threshold (e.g., the mean_sp<10 and std_dev<5).

In some embodiments, the features representing a row may include a maximum height difference between any two words in the row. The maximum height difference is helpful in determining whether a row belongs to the dominant table because the font sizes in a dominant table typically do not vary much. Additionally, this feature advantageously does not require knowing the meaning of the words.

In some embodiments, the features representing a row may include a header indicator. The header may be identified by analyzing textual content and by analyzing the spacing of text that is vertically separated from the previous non-running text row. The header can be used to mark the beginning of a dominant table.

In some embodiments, the features representing a row may include row identification. The dominant rows may be identified by assigning an integer value to each row. For example, the topmost row may be numbered "1", and each subsequent row beneath the topmost row may be assigned consecutive numbers.

As previously mentioned, the method of extracting structured information from implicit tables may include comparing the set of features for each dominant row with one another to determine a measure of similarity between each of the dominant rows. Comparing the set of features for each dominant row with one another may be performed using machine learning. Once the rows of the dominant table are identified and the features representing these rows are determined, the similarity of the rows may be compared. For example, a similarity measure of two feature vectors representing two different rows may be determined using a Euclidean distance function to determine the Euclidean distance between the two feature vectors. In a more specific example, the rows may be each represented by two coordinates (x,y) in a two-dimensional space. To find the distance between two rows, the following distance formula may be applied:

$$d=\sqrt{(x_1-x_2)^2+(y_1-y_2)^2}.$$

One of skill in the art will understand that metrics other than Euclidean distance may also be used to determine measures of similarity. It is understood that comparing the set of features for each dominant row with one another may include comparing the set of features of an individual row against the set of features of each of the other individual rows. The measure of similarity may be used to determine whether each of the dominant rows is part of a cluster of rows.

Comparing the set of features for each dominant row with one another to determine a measure of similarity between each of the dominant rows may include comparing the set of features of an individual dominant row with the set of features of each of the other rows. For example, the set of features of a first dominant row may be compared with: (1) the set of features of a second dominant row; (2) the set of features of a third dominant row; and (3) the set of features of a fourth dominant row, . . . and an nth dominant row, etc. In the same example, the set of features of the second dominant row may be further compared with the set of features of the third dominant row, the fourth dominant row, . . . and an nth dominant row, etc.

Comparing the set of features for each dominant row with one another to determine a measure of similarity between each of the dominant rows may include comparing individual and/or subsets of features from the set of features of each dominant row. For example, comparing individual features for each dominant row with one another may include comparing the number of columns in each dominant row. In some embodiments, the number of columns in each dominant row may be determined when determining a set of features representing each of the dominant rows. This number of columns may be an estimated number of columns.

Comparing the number of columns may be include finding the difference in the number of estimated columns within two different dominant rows, and passing the difference through a compressing function, such as the Sigmoid function. The Sigmoid function is $$S(x) = \frac{1}{1+e^{-x}}$$

where x is the difference in number of estimated columns. The Sigmoid function compresses the difference in the number of rows into a number that can be more easily compared. If the result of compressing the difference in number of columns through the Sigmoid function is negative, then the result is considered near zero. If the result of compressing the difference in number of columns through the Sigmoid function is highly positive, then the result is considered near one. If the Sigmoid function results in a value of more than two, the column difference is penalized. This rule is stored as Sigmoid(n_col_diff-2).

In some embodiments, comparing a subset of features for each dominant row with one another may include comparing a layout similarity of each dominant row. In some embodiments, the layout similarity may be a subset of features described by a single feature vector. For example, the layout similarity may include the mean word spacing, the standard deviation of word spacing, the row width, and the row height. Comparing a subset of features describing layout similarity ensures that the dominant rows have a similar look. In some embodiments, when comparing features of layout similarities, the Euclidean distance between the two subsets of features of two dominant rows may be determined.

In some embodiments, comparing an individual feature of each of the dominant rows may include comparing the line representation of the dominant rows. Comparing the line representation between two rows captures the similarity of the content distribution in two rows. In this comparison, the distance between feature vectors describing the similarity of the content distribution between two dominant rows may be described as sum(L1_rep AND L2_rep)/min(sum(L1_rep),sum (L2_rep)).

The numerator in this formula is the overlap between two rows and the denominator is the row with the least information content. FIG. 9 shows an example of finding the distance between two feature vectors describing the similarity of the content distribution between two dominant rows. As discussed above with respect to FIG. 9, 1's are used to detect characters and 0s are used to detect white spaces. When comparing the line representation between two rows, the 1's in each row are added up. For example, in the embodiment shown in FIG. 9, the 1's in Row 1 are shown in the line distribution of Row 1, and these 1's add up to 10. In this example, the 1's in Row 2 are shown in the line distribution of Row 2, and these 1's add up to 15. A summary 910 shows the number of 1's in Row 1 that overlap with 1's in Row 2. The 1's in summary 910 add up to 10. In this instance, the distance between feature vectors describing the similarity of the content distribution between two dominant rows is the sum of the 1's in summary 910 divided by the number of 1's in Row 1. Thus, the distance between feature vectors describing the similarity of the content distribution between two dominant rows is 10/10, or 1. The similarity score is not penalized just because the row 1 has a missing word. This helps tackle the problem of one row having missing values in one or more columns while the rows are still they are part of the same table. The process of using 1's to mark the characters and 0s to mark the white spaces, and then finding the overlap of 1's increases the efficiency of comparing the content distribution between two dominant rows. This process is very simple and easy to visualize in juxtaposition with comparing specific words in each row.

In some embodiments, comparing an individual feature of each of the dominant rows may include comparing the vertical separation of the dominant rows. In other words, the spacing between each of dominant rows may be the individual feature of interest in this scenario. The vertical separation among rows may include using a Sigmoid function to compress the difference in vertical separation among rows. In this scenario, x is the difference in the vertical separation. This rule is stored as Sigmoid (abs(Row_id1-Row_id2)-3).

The output of the Sigmoid function is analyzed in comparing the vertical separation among rows in the same manner as the output is analyzed in comparing the column numbers, which is discussed above. A "Row id" is a proxy for the position of the row with respect to the top of the image. The above Sigmoid function states that two widely separated rows will not be part of the same cluster unless they are transitively connected to each other through the rows that are between them.

Comparing the set of features for each dominant row with one another to determine a measure of similarity between each of the dominant rows may include calculating the mean of the distances between the individual features and/or subsets of features. For example, with respect to the four examples of distances between the individual features and/or subsets of features described above, comparing the set of features for each dominant row with one another may include adding up the four distances and dividing by the number distances, which would be four in this example. The mean of the distances may be calculated for each dominant row. This mean for each dominant row may be used in determining that a dominant row is part of a cluster of rows. The mean of the distances calculated for each row gives a visual sense of similarity due to the particular individual and/or subset of features used to determine the distances.

As previously mentioned, the method of extracting structured information from implicit tables may include determining that each of the dominant rows is part of a cluster of rows. Ensuring that the dominant rows share a high measure of similarity helps ensure that the dominant rows have been properly identified in the dominant table. In some embodiments, a membership score for each dominant row may be used to determine whether a dominant row is part of a cluster of rows. The membership score is the average distance that the member (e.g., dominant row) of the cluster has with all the other members (e.g., dominant rows).

The membership score is inversely proportional to the mean distance. If the mean distance is 0 that means each of the rows are perfectly alike. That means they have a membership score of 1, which is the highest membership score. The membership score is used to draw column separator lines. The line representation of each of the member rows is multiplied by the membership score of the row and summed up. The resulting vector is then thresholded with converting values less than 1 to zeros. If the length of the run of zeros (consecutive zeros) within the thresholded vector is greater than a threshold length, the vertical spacing is assumed consistent. And a column separator line is put in that space in a way that it crosses minimum text. The weighting of the line representation by membership score ensures that the bad members of the clusters are given less weightage while determining the column guard lines.

The membership score can be used to determine how important an individual member (e.g., dominant row) is to the structure of the cluster (e.g., dominant table). The dominant rows determined to have membership scores above a predetermined threshold similarity value may be considered members of the cluster. The predetermined threshold may be based upon the distribution of the membership scores. For example, the predetermined threshold similarity value may be based upon the average of the membership scores. In some embodiments, it has been observed that a high threshold will result in a system with high recall and a low threshold will result in a system with high precision. In some embodiments, the predetermined threshold similarity value may be based upon the distance. For example, a high threshold similarity value may indicate a low distance value. In some embodiments, density-based spatial clustering of applications with noise (DBSCAN) may be used to determine that each of the identified dominant rows is actually part of a cluster of rows.

As previously mentioned, the method of extracting structured information from implicit tables may include comparing spatial positions of white spaces of the dominant rows with one another. The white spaces between dominant rows may indicate where column separator lines can be placed. For a column separator line to be properly placed in an implicit table, the column indicator should only be placed where there is white space in the table. In other words, a column separator line placed over text in an implicit table is improperly placed. Consistent white spaces between portions of dominant rows may be used to determine where to draw column separator lines between columns. Comparing spatial positions of white spaces of the dominant rows may include finding the location and/or size of the white spaces of each dominant row.

As previously mentioned, the method of extracting structured information from implicit tables may include determining a white space confidence rating based on the comparison between the spatial positions of the white space(s) of each of the dominant rows. In some embodiments, the white space confidence rating may include the probability that a column separator exists in a certain location. In some embodiments, the white space confidence rating may be based on the overlap of the white space of two rows. In other words, the white space confidence rating may be based on how much of a white space two dominant rows have in common or how much of multiple white spaces two dominant rows have in common.

As previously mentioned, the method of extracting structured information from implicit tables may include generating a column separator line for the dominant rows based on the white space confidence rating. The white space confidence rating could help in determining where to place the column separator line in this step. Placing the column separator lines is a way of identifying the columns of the dominant rows. In other words, the column separator lines define the boundaries of the columns.

In some embodiments, the column separator lines generated based upon the white space confidence rating may be presented to the user through user interface to get the user's approval. For example, in some embodiments, the column separator lines generated based upon the white space confidence rating may be presented to the user automatically after every generation. In other embodiments, the column separator lines generated based upon the white space confidence rating may be presented to the user automatically only when the white space confidence rating is below a certain threshold. In some embodiments, a user may decide when to view the separator lines generated based upon the white space confidence rating. When the separator lines generated based upon the white space confidence rating are presented to the user, the user can click on column separator line and move it. In other words, the user may alter the location of the separator line. The new location of the line may be fed back to a machine learning model used to determine the white space confidence rating and/or generate the column separator lines, such that this feedback of the user may be used in future when determining white space confidence ratings and/or generating column separator lines. In addition to altering the location of a separator line, a user can delete and/or add column separator lines. In some embodiments, a user's changes to one image input document may be applied to a plurality of other documents. In such embodiments, the changes may be automatically applied to the plurality of other documents based on the relationship between the image input document. In other such embodiments, the changes may be manually applied to the plurality of other documents based on the user's actions.

FIG. 10 illustrates the document of FIG. 4 after column separator lines have been generated. In this embodiment, the column separator lines are all placed in locations between columns of implicit table 400, which is the dominant table of FIGS. 4-8 and 10. The column separator lines are indicated by reference numbers 1000, 1002, 1004, 1006, and 1008.

In some embodiments, generating a column separator line for the dominant rows based on the white space confidence rating may further include comparing one or more column separator lines between multiple input document images. For example, FIGS. 11-13 illustrate a first input image document 1100 being compared with a second input image document 1200 and a third input image document 1202. In this embodiment, first input image document includes a first space 1102 between a column labeled "price" and a column labeled, "market value", as well as a second space 1104 between the column labeled, "market value" and a column labeled, "% of port." During processing of first input image document 1100, column separator lines were not generated along first space 1102 and second space 1104. This omission of column separator lines may be because the white space confidence rating was too low when the white spaces of columns of first input image document 1100 were compared to one another. For example, a low white space confidence rating may have been caused by a smudge (not shown) or other artifact appearing on first space 1102 and second space 1104.

FIG. 12 shows first input image document 1100 with second input image document 1200 and third input image document 1202. In this example, second input image document 1200 and third input image document 1202 are sibling documents to first input image document 1100. In other words, first input image document 1100, second input image document 1200, and third input image document 1202 may include the same dominant table rolling over onto multiple pages. In some embodiments, sibling documents may be documents having a similar structure, type, or format. As shown in FIG. 12, second input image document 1200 includes a first column separator line 1204 between a column labeled "price" and a column labeled, "market value." Second input image document 1200 also includes a second column separator line 1206 between the column labeled, "market value" and a column labeled, "% of port." Similarly, third input image document 1202 includes a third column separator line 1208 between a column labeled "price" and a column labeled, "market value." Similarly, third input image document 1202 includes a fourth column separator line 1210 between the column labeled, "market value" and a column labeled, "% of port."

When comparing first input image document 1100 with second input image document 1200 and third input image document 1202, the system will find that second input image document 1200 and third input image document 1202 both contain column separator lines where first input image document 1100 does not include column separator lines. In some embodiments, the system may automatically self-correct by applying column separator lines in first space 1102 and second space 1104. For example, FIG. 13 shows an edited version 1300 of input image document 1100 in which a fifth column separator line 1302 has been added in a location based on the location of first column separator line 1204 and third column separator line 1208. In the same example, FIG. 13 shows a sixth column separator line 1304 added in a location based on the location of third column separator line 1208 and fourth column separator line 1210.

In other embodiments, the system may alert the user when a sibling separator line confidence rating based on the comparison between the column separator lines among sibling documents is below a predetermined sibling separator line similarity threshold. For example, the method of extracting structured information from an implicit table may include determining a sibling separator line confidence rating based on the comparison between the first column separator line with the second column separator line, wherein a user is alerted if the sibling separator line confidence rating is below a predetermined sibling separator line similarity threshold.

As previously mentioned, the method of extracting structured information from implicit tables may include populating a two-dimensional data structure using the at least two dominant rows and the column separator lines. In some embodiments, the two-dimensional data structure may be a data structure in a database, such as a relational database. In some embodiments, the database may be used for storing information used by other applications. For example, the database may be used to store information related to medical records, customer information, and/or financial records, etc. Thus, the structured information extracted by the disclosed system and method may be used by other applications once the structured information is stored in the two-dimensional data structure. The disclosed system and method make it convenient to quickly and easily extract data from scanned images, such that very old scanned images may suddenly become usable as data sources.

Figure 14:
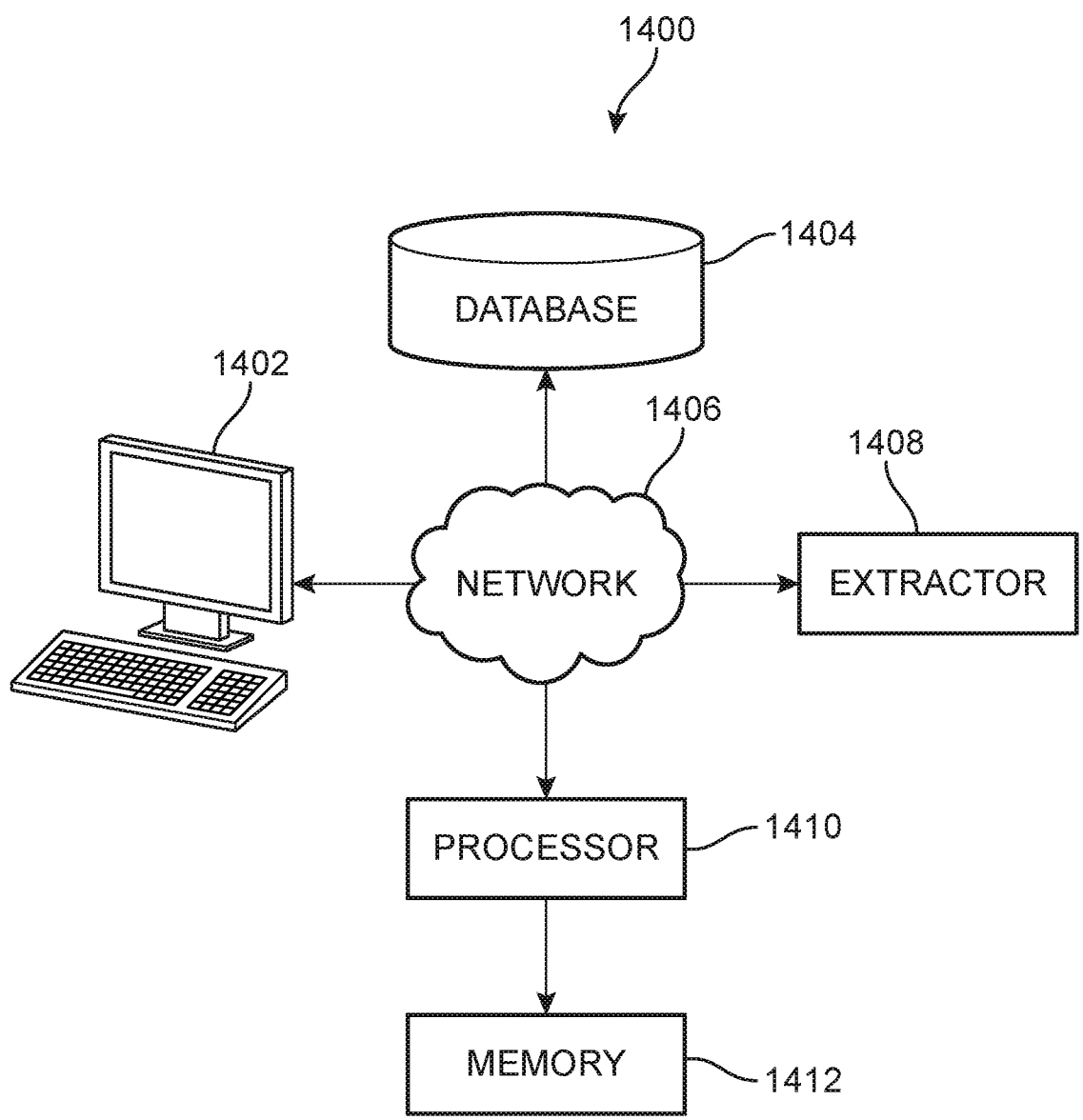
FIG. 14 is a schematic diagram of an embodiment of a system for extracting structured information from an implicit table.

FIG. 14 illustrates an embodiment of a system for extracting structured information from implicit tables 1400 (or system 1400). The system for extracting structured information from implicit tables may include a user interface. For example, system 1400 includes a user device 1402. In some embodiments, such as the embodiment shown in FIG. 14, the user device may include a tablet computer. In other embodiments, the user device may include a smart phone, a laptop computer, a desktop computer, or another type of computing device. The user device may include a display that provides an interface for the user to input information. For example, as discussed in more detail above, the user device may display an interface through which the user may view and adjust column separator lines. In some embodiments, one or more user devices may be used for inputting information.

The system for extracting structured information from implicit tables may include a database. For example, system 1400 includes a database 1404. In some embodiments, the database may be a relational database. In some embodiments, the database may be used for storing information used by other applications. For example, the database may be used to store information related to medical records, customer information, and/or financial records, etc.

The system for extracting structured information from implicit tables may include an extractor. For example, system 1400 includes an extractor 1408. The extractor may perform various steps of the method for extracting structured information from implicit tables. For example, the extractor may identify dominant rows and/or compare the white spaces between different rows.

The system for extracting structured information from implicit tables may include a network. For example, system 1400 includes a network 1406. The components of the system may communicate through the network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN.

The system for extracting structured information from implicit tables may include a processor. For example, system 1400 includes a processor 1410. The processor may include a single device processor located on a single device, or it may include multiple device processors located on one or more physical devices.

The system for extracting structured information from implicit tables may include a memory for storing components of the system. For example, system 1400 includes a memory 1412. The memory may include any type of storage, which may be physically located on one physical device, or on multiple physical devices.

Implementations of the various techniques described herein may be implemented in digital electronic circuitry, or in computer hardware, firmware, software, or in combinations of them (e.g., an apparatus configured to execute instructions to perform various functionality).

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a non-transitory "computer-readable storage medium" or a "computer-readable storage device."

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor may receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

We claim:

1. A method of extracting structured information from an implicit table, comprising:

obtaining a first input image document containing an implicit table, wherein the first input image document includes text;

identifying words in the text;

identifying a first dominant row formed by a first portion of the text and a second dominant row formed by a second portion of the text, wherein the first dominant row and the second dominant row are each horizontal rows belonging to the implicit table of the first input image document;

determining a first set of features for the first dominant row;

determining a second set of features for the second dominant row;

comparing the first set of features with the second set of features to determine a measure of similarity between the first set of features and the second set of features;

determining that the first dominant row and the second dominant row are part of a cluster of rows based on a determination that the measure of similarity between the first set of features and the second set of features exceeds a predetermined threshold similarity value;

identifying a first set of spatial positions of a first set of white spaces of the first dominant row and a second set of spatial positions of a second set of white spaces of the second dominant row;

determining whether each individual spatial position of the first set of spatial position overlaps vertically with a spatial position of the second set of spatial positions;

determining a white space confidence rating for each individual spatial position of the first set of spatial positions, wherein the white space confidence rating is a probability that a column separator exists in a certain location and the white space confidence rating is determined based on determining whether each individual spatial position of the first set of spatial position overlaps vertically with a spatial position of the second set of spatial positions;

generating a first set of column separator lines for the first dominant row and the second dominant row based upon the white space confidence rating for each individual spatial position of first set of spatial positions;

comparing the first set of column separator lines generated for the first input image document with a second set of column separator lines generated for a second input image document and a third set of column separator lines generated for a third input image document, wherein the second input image document and the third input image document are sibling documents to the first input image document and wherein sibling documents are documents each having at least two column separator lines in the same spatial position in each document;

determining, based on the comparison between the first set of column separator lines, the second set of column separator lines, and the third set of column separator lines, that the second set of column separator lines and the third set of column separator lines each include a column separator line in a third spatial position and that the first set of column separator lines does not include a column separator line in the third spatial position;

automatically self-correcting by applying an additional column separator line to the first input image document in the third spatial position; and using the layout of the first dominant row, the second dominant row, the first set of column separator lines, and the additional column separator line to identify columns of the implicit table.

2. The method of claim 1, wherein identifying a first dominant row formed by a first portion of the text and a second dominant row formed by a second portion of the text includes filtering out rows without tab spacings.

3. The method of claim 1, wherein identifying a first dominant row formed by a first portion of the text and a second dominant row formed by a second portion of the text includes filtering out rows having less than three columns.

4. The method of claim 1, wherein comparing the first set of features with the second set of features to determine a measure of similarity between the first set of features and the second set of features includes comparing the number of columns in the first dominant row with the number of columns in the second dominant row.

5. The method of claim 1, wherein the first set of features is represented by a first feature vector and the second set of features is represented by a second feature vector.

6. The method of claim 5, wherein comparing the first set of features with the second set of features includes finding the distance between the first feature vector and the second feature vector.

7. The method of claim 1, wherein the implicit table of the first input image document rolls over onto the second input image document and the third input image document.

8. The method of claim 7, further including:

determining a sibling separator line confidence rating based on the comparison between the first set of column separator lines and the second set of column separator lines, wherein a user is alerted if the sibling separator line confidence rating is below a predetermined sibling separator line similarity threshold.

9. A non-transitory computer-readable medium storing software comprising instructions that are executable by one or more device processors to extract structured information from implicit tables by:

obtaining a first input image document containing an implicit table, wherein the first input image document includes text;

identifying words in the text;

identifying a first dominant row formed by a first portion of the text and a second dominant row formed by a second portion of the text, wherein the first dominant row and the second dominant row are each horizontal rows belonging to the implicit table of the first input image document;

determining a first set of features for the first dominant row;

determining a second set of features for the second dominant row;

comparing the first set of features with the second set of features to determine a measure of similarity between the first set of features and the second set of features;

determining that the first dominant row and the second dominant row are part of a cluster of rows based on a determination that the measure of similarity between the first set of features and the second set of features exceeds a predetermined threshold similarity value;

identifying a first set of spatial positions of a first set of white spaces of the first dominant row and a second set of spatial positions of a second set of white spaces of the second dominant row;

determining whether each individual spatial position of the first set of spatial position overlaps vertically with a spatial position of the second set of spatial positions;

determining a white space confidence rating for each individual spatial position of the first set of spatial positions, wherein the white space confidence rating is a probability that a column separator exists in a certain location and the white space confidence rating is determined based on determining whether each individual spatial position of the first set of spatial position overlaps vertically with a spatial position of the second set of spatial positions;

generating a first set of column separator lines for the first dominant row and the second dominant row based upon the white space confidence rating for each individual spatial position of first set of spatial positions;

comparing the first set of column separator lines generated for the first input image document with a second set of column separator lines generated for a second input image document and a third set of column separator lines generated for a third input image document, wherein the second input image document and the third input image document are sibling documents to the first input image document and wherein sibling documents are documents each having at least two column separator lines in the same spatial position in each document;

determining, based on the comparison between the first set of column separator lines, the second set of column separator lines, and the third set of column separator lines, that the second set of column separator lines and the third set of column separator lines each include a column separator line in a third spatial position and that the first set of column separator lines does not include a column separator line in the third spatial position;

automatically self-correcting by applying an additional column separator line to the first input image document in the third spatial position; and using the layout of the first dominant row, the second dominant row, the first set of column separator lines, and the additional column separator line to identify columns of the implicit table.

10. The non-transitory computer-readable medium of claim 9, wherein the first set of features is represented by a first feature vector and the second set of features is represented by a second feature vector.

11. The non-transitory computer-readable medium of claim 10, wherein comparing the first set of features with the second set of features includes finding the distance between the first feature vector and the second feature vector.

12. The non-transitory computer-readable medium of claim 9, wherein the implicit table of the first input image document rolls over onto the second input image document and the third input image document.

13. The non-transitory computer-readable medium of claim 12, further including:

determining a sibling separator line confidence rating based on the comparison between the first set of column separator lines and the second set of column separator lines, wherein a user is alerted if the sibling separator line confidence rating is below a predetermined sibling separator line similarity threshold.

14. The non-transitory computer-readable medium of claim 9, wherein identifying a first dominant row formed by a first portion of the text and a second dominant row formed by a second portion of the text includes filtering out rows without tab spacings.

15. A system for extracting structured information from image documents, the system comprising:

a device processor; and a non-transitory computer readable medium storing instructions that are executable by the device processor to:

obtain a first input image document containing an implicit table, wherein the first input image document includes text;

identify words in the text;

identify a first dominant row formed by a first portion of the text and a second dominant row formed by a second portion of the text, wherein the first dominant row and the second dominant row are each horizontal rows belonging to the implicit table of the first input image document;

determine a first set of features for the first dominant row;

determine a second set of features for the second dominant row;

compare the first set of features with the second set of features to determine a measure of similarity between the first set of features and the second set of features;

determine that the first dominant row and the second dominant row are part of a cluster of rows based on a determination that the measure of similarity between the first set of features and the second set of features exceeds a predetermined threshold similarity value;

identify a first set of spatial positions of a first set of white spaces of the first dominant row and a second set of spatial positions of a second set of white spaces of the second dominant row;

determine whether each individual spatial position of the first set of spatial position overlaps vertically with a spatial position of the second set of spatial positions;

determine a white space confidence rating for each individual spatial position of the first set of spatial positions, wherein the white space confidence rating is a probability that a column separator exists in a certain location and the white space confidence rating is determined based on determining whether each individual spatial position of the first set of spatial position overlaps vertically with a spatial position of the second set of spatial positions;

generate a first set of column separator lines for the first dominant row and the second dominant row based upon the white space confidence rating for each individual spatial position of first set of spatial positions;

compare the first set of column separator lines generated for the first input image document with a second set of column separator lines generated for a second input image document and a third set of column separator lines generated for a third input image document, wherein the second input image document and the third input image document are sibling documents to the first input image document and wherein sibling documents are documents each having at least two column separator lines in the same spatial position in each document;

determine, based on the comparison between the first set of column separator lines, the second set of column separator lines, and the third set of column separator lines, that the second set of column separator lines and the third set of column separator lines each include a column separator line in a third spatial position and that the first set of column separator lines does not include a column separator line in the third spatial position;

automatically self-correct by applying an additional column separator line to the first input image document in the third spatial position; and use the layout of the first dominant row, the second dominant row, the first set of column separator lines, and the additional column separator line to identify columns of the implicit table.

16. The system of claim 15, wherein the first set of features is represented by a first feature vector and the second set of features is represented by a second feature vector.

17. The system of claim 16, wherein comparing the first set of features with the second set of features includes finding the distance between the first feature vector and the second feature vector.

18. The system of claim 15, wherein the implicit table of the first input image document rolls over onto the second input image document and the third input image document.

19. The system of claim 18, further including:
determining a sibling separator line confidence rating based on the comparison between the first set of column separator lines and the second set of column separator lines, wherein a user is alerted if the sibling separator line confidence rating is below a predetermined sibling separator line similarity threshold.

20. The system of claim 15, wherein identifying a first dominant row formed by a first portion of the text and a second formed by a second portion of the text includes filtering out rows without tab spacings.

* * * * *